(12) United States Patent
Theelen

(10) Patent No.: US 6,372,851 B1
(45) Date of Patent: Apr. 16, 2002

(54) MALEATED LIQUID $C_5$ HYDROCARBON RESINS

(75) Inventor: Michel Hendrikus Theelen, Westkapelle (NL)

(73) Assignee: Eastman Chemical Resins, Inc., Kingsport, TN (US)

( * ) Notice: Subject to any disclaimer, the term of this patent is extended or adjusted under 35 U.S.C. 154(b) by 89 days.

(21) Appl. No.: 09/611,032

(22) Filed: Jul. 6, 2000

(51) Int. Cl.[7] .................................................. C08F 8/00
(52) U.S. Cl. ..................... 525/285; 525/327.9; 525/386; 526/272
(58) Field of Search ............................... 525/285, 327.9, 525/386; 526/272

(56) References Cited

U.S. PATENT DOCUMENTS

| 3,005,800 A | 10/1961 | Powers et al. |
|---|---|---|
| 3,450,560 A | 6/1969 | Bacskai |
| 3,655,629 A | 4/1972 | Takahara |
| 3,905,948 A | 9/1975 | Vargiu et al. |
| 3,933,720 A | 1/1976 | Iwai et al. |
| 3,953,407 A | 4/1976 | Hayashi et al. |
| 4,086,198 A | 4/1978 | Mizui et al. |
| 4,230,840 A | 10/1980 | Katayama et al. |
| 4,401,791 A | 8/1983 | Hultzsch et al. |

FOREIGN PATENT DOCUMENTS

| EP | 0 074 273 A1 | 3/1983 |
|---|---|---|
| EP | 0 300 624 | 1/1989 |
| EP | 0 311 402 | 4/1989 |
| GB | 1356309 | 6/1974 |

*Primary Examiner*—Bernard Lipman
(74) *Attorney, Agent, or Firm*—B. J. Boshears; Bernard J. Graves, Jr.

(57) ABSTRACT

Acid modified $C_5$ hydrocarbon resins are disclosed. The resins are predominantly piperylene resins with isobutylene. The resins are acid modified with from about 0.1 to 30 weight percent maleic anhydride to provide an acid-modified resin with a acid number from about 30 to about 170 mg KOH/g resin. The acid-modified resins have a mettler drop softening point from about 40° C. to about 140° C. The acid modified resins are useful as a natural rosin alternative.

17 Claims, No Drawings

MALEATED LIQUID C₅ HYDROCARBON RESINS

FIELD OF THE INVENTION

This invention relates to functionalized hydrocarbon resin compositions having similar physical properties as natural rosin and to methods for their preparation. More particularly, this invention relates to acid-modified liquid $C_5$ hydrocarbon resin compositions prepared from piperylene and unsaturated carboxylic acids or anhydrides and their use as an alternative to natural rosin.

BACKGROUND OF THE INVENTION

Rosin is a natural resin extracted from pine trees and is a nonvolatile resin typically obtained from gum resin after distillation of turpentine. Rosin is a mixture of monocarboxylic diterpene acids. Rosin is often characterized by its color, softening point and its acidity. Rosin quality varies with many factors, such a species of pine tree, age and size of a tree, climate, tapping method, etc.

Natural rosin typically has a softening point from about 70° C. to about 85° C. and an acid number from about 150 to 190 mg KOH/g. These properties can be altered by processing techniques, such as hydrogenation, disproportionation, polymerization and chemical reaction, to yield a large number of derivatives.

Because rosin is an acidic material, its acid functionality is utilized in many commercial applications. Rosins are often used in the manufacture of adhesives, paper sizing agents, printing inks, solders and fluxes, various surface coatings, insulating materials for the electronics industry, synthetic rubber, chewing gums, soaps and detergents.

The characteristics of rosin as a natural product, however, are varied. Attempts have been made to provide a synthetic substitute for natural rosin. For example, polymerization of olefinic hydrocarbons may be used to produce resin synthetic substitutes for the naturally occurring resins in rosin. Post modification of olefinic hydrocarbons, such as by dicarboxylic acid or anhydride adduction, can be used to provide the desired acidity. Such modification, however, may also alter other properties of the modified-resin thereby making it unacceptable as a rosin alternative.

For example, U.S. Pat. No. 3,005,800 describes the maleic anhydride modification of a petroleum distillate having a distillation of 90% below 125° C. Friedel-Crafts is polymerization of the distillate yielded a steam-stripped resin having a softening point range from 70 to 100° C. and an unstripped resin having a softening point range from 50 to 60° C. From about 10 to 28 weight percent maleic anhydride was added to these resins. The maleic anhydride modification, however, increased the softening point to greater than 110° C., making these modified resins unsuitable as a natural rosin replacement.

U.S. Pat. No. 3,450,560 describes up to one percent maleic anhydride modification of a hydrocarbon resin to improve the resin's adhesion and dyeability characteristics. The resin, however, has a large molecular weight of at least 50,000 daltons for use as dyeable film on aluminum articles. Such a high molecular weight resin may be useful as an adhesive, but is not acceptable as a rosin alternative due to its high molecular weight.

U.S. Pat. No. 3,655,629 describes a hydrocarbon resin having improved adhesion than natural terpene resins. The hydrocarbon resin is obtained by a 5 to 10 per weight percent maleic anhydride addition to a hydrocarbon resin obtained cracked gasoline or light oil compositions. Although the patent describes a maleated resin with broad range of acid values, i.e., 30 to 250, and softening points, i.e., 0 to 150° C., no specifically described resin has characteristics similar to natural rosin. Disclosed resins that have similar softening points to natural rosin, however, exhibit lower acid numbers than that of natural rosin. Furthermore, disclosed resins that have similar acid numbers to natural rosin, however, exhibit lower softening points than that of natural rosin.

G.B. Patent No. 1,356,309 describes reacting from 25 to 35 weight percent maleic anhydride with a butadiene-cyclopentadiene copolymer. The maleated copolymer had acid numbers from about 200 to 370 and softening point from about 44 to 112. These maleated copolymers, however, have acid numbers that are higher than those typical of natural rosin.

U.S. Pat. No. 3,905,948 describes reacting from 5 to 20 weight percent maleic anhydride with a hydrocarbon resin formed from the Friedel-Crafts polymerization of a 30° to 300° C. boiling point hydrocarbon stream. The reaction product had softening points greater than 160° C. and low acid numbers of only 20 to 40. Such low acid numbers are not typical of natural rosin.

U.S. Pat. No. 3,933,720 describes acid modified hydrocarbon resins with good adhesive characteristics as compared to alkylphenolic resins. From 0.1 to 30 weight percent maleic acid or anhydride is reacted with a resin obtained by the Friedel-Crafts polymerization of a cracked hydrocarbon steam boiling at 140° C. to 280° C. or 20° C. to 140° C. The acid modified resins were combined with polychloroprene to provide adhesive compositions. The resins of this patent, however, had higher softening points than natural rosin prior to acid modification of 7 to 10 weight percent maleic anhydride.

U.S. Pat. No. 4,230,840 describes an acid modified hydrocarbon resin obtained from reacting a hydrocarbon resin obtained from reacting a hydrocarbon resin with from about 0.1 to about 5 weight percent unsaturated dicarboxylic anhydride. The hydrocarbon resin was formed from a hydrocarbon stream containing from 25 to 75 weight percent catatonically polymerizable aromatic hydrocarbons. Softening points of about 130° C. were obtained upon acid modification, which exceed the typical values of natural rosin.

E.P. Patent No. 074,273 describes acid modified hydrocarbon resins formed from the reaction product of 0.1 to 33 weight percent unsaturated dicarboxylic acid of anhydride with hydrocarbon resin. The maximum amount of acid, however, added to the resin in any given example was only about 2 weight percent. While acid values from 0.1 to 150 and softening points from 60° C. to 180° C. are described, only acid numbers of less than 15 and softening points in excess of 94° C. were demonstrated for acid-modified resins. Furthermore, the acid-modified resins of this patent contain significant quantities of 9,10-dihydrodicyclopentadiene to control the resin characteristics, such as softening point.

U.S. Pat. No. 4,401,791 described an acid modified hydrocarbon resin suitable for use as a binder in printing ink. The resin is a reaction product of 3 to 20 weight percent dicarboxylic acid units, an alkyl phenol-aldehyde resin and a hydrocarbon stream rich in olefinically unsaturated aromatics or cyclopentadiene. The acid modified resins have softening points of 120° C. to 180° C. and acid numbers of 30 to 50. Such softening points and acid numbers are not, however, typical of natural rosin.

E.P. Patent No. 300,624 describes a water dispersible tackifier resin that can be acid-modified with about 2.5 weight percent maleic anhydride to provide acid-modified resins having a softening point from about 70–140° C. and an acid number from about 10 to 30. The resin is produced from dicyclopentadiene, styrene and terpene monomers. The patent describes the potential for an acid-modified resin having a softening point below 150° C. and having an acid number from 10 to 150. Such properties, however, were not demonstrated in the patent. Maleated resins had softening points from 70 to 140° C., but had acid numbers of less than 30.

E.P. Patent No. 311,402 describes an ink composition formed from a cyclic or di-cyclic pentadiene, an unsaturated olefinic aromatic and unsaturated carboxylic acids or anhydrides. Softening points from about 150 to 170° C. and acid numbers from about 10 to 15 were obtained with 3 to 5 weight percent acid modification.

U.S. Pat. No. 3,953,407 describes a process for preparing an acid-modified hydrocarbon resin for controlling paper sizes. The resin is formed from hydrocarbons having 5 to 10 carbon atoms. The resin is acid-modified with up to 20 weight percent unsaturated dicarboxylic acid or anhydride, such as maleic acid or anhydride. The acid-modified resins have softening points from 50 to 95° C. These resins have saponification values from about 80 to about 190. These resins, however, must be heated in the presence of water or an alkali metal hydroxide to reduce the saponification value to about 60 to 140 to be useful as a replacement for natural rosin for controlling paper sizes.

Despite the attempts of the prior art, a hydrocarbon resin suitable as a rosin replacement has remained illusive. There is a need to provide a hydrocarbon resin having the physical properties of natural rosin, including the acid functionality of natural rosin. Such a hydrocarbon resin would serve as a rosin alternative.

SUMMARY OF THE INVENTION

The present invention is a hydrocarbon composition useful as a rosin alternative and a process for making the same. The hydrocarbon composition includes a hydrocarbon resin grafted with maleic anhydride. The hydrocarbon resin is made from a Friedel-crafts polymerized petroleum stream. The petroleum stream is a predominant $C_5$ hydrocarbon stream containing piperylene monomers. The predominant $C_5$ hydrocarbon stream is polymerized with a chain transfer agent, such as $C_4$ or $C_5$ olefins and/or dimers. Maleic anhydride adduction reaction is carried out thermally at about 240° C. for about 2 to about 4 hours. The physical properties of the resins are controlled by balance between the properties of the precursor resin, the amount of maleic anhydride grafted to this precursor resin and control of post-grafting process procedures. For example, with additional streaming after the adduction step the softening point and the viscosity of the inventive acid-modified resin can further be varied and controlled. Surprisingly, it is thus possible to obtain resins with a desired softening point, viscosity and acid number independent of each other.

In one aspect the acid-modified resin of the present invention has the following properties:

a. a mettler drop softening point (MDSP) softening point varying from 40° C. to 140° C.;

b. a viscosity at 120° C. (Brookfield) between 1,000 to 100,000 mPa.s;

c. a number average molecular weight (Mn) from 600 to 1,200 daltons, a weight average molecular weight (Mw) from 900 to 3,000 daltons, a Z-average molecular weight (Mz) from 1,200 to 7,000 daltons and a polydispersity (Mw/Mn) below 3.0; and d. an acid number between 0.1 and 200 mg KOH/g.

In another aspect of the present invention, an acid-modified resin having similar physical properties to natural rosin is obtained with the following properties:

a. a MSDP softening point varying from 75° C. to 90° C.;

b. a viscosity at 120° C. (Brookfield) between 1,500 to 23,000 mPa.s;

c. a Mn from 600 to 800 dalton, an Mw from 900 to 1,200 dalton, an Mz from 1,000 to 1,500 dalton and an Mw/Mn below 2.0; and d. an acid number between 140 and 170 mg KOH/g resin.

The acid-modified resins of the present invention have similar solubility behavior in a caustic solution as rosin, exhibit less deviations in properties after recovery from the caustic solution, have a better thermal stability and have more elastic characteristics than natural rosin. These resins can be used as rosin alternative in numerous applications where pure rosin is used because of their specific physical properties.

The acid modified resins of the present invention may be prepared by acid modification of a polymer hydrocarbon resin. A predominantly $C_5$ hydrocarbon stream containing unsaturated aliphatic monomers is provided. The unsaturated aliphatic monomers include a combination of piperylene monomers, less than about 15% weight cyclopentadiene and dicyclopentadiene monomers and less than about 3% weight isoprene. A second hydrocarbon stream having an isoolefin monomer is provided. These streams are combined to obtain a weight ratio of the isoolefin monomer to the unsaturated aliphatic monomers from about 0.25/1 to about 0.75/1. The combined streams are polymerized at a temperature from about 25° C. to about 75° C. to form a polymer resin. The polymer resin is acidified with dicarboxylic acid or anhydride at a weight ratio from about 0.15 to about 0.45 of the dicarboxylic acid or anhydride to the unsaturated aliphatic monomers and the isoolefin monomer. The acid-modified polymer resin is then recovered.

DETAILED DESCRIPTION OF THE INVENTION

The hydrocarbon polymer resins of the present invention are prepared by Friedel-Crafts polymerization in which a combination of a cracked petroleum feed and a chain transfer agent in an inert solvent is treated with 0.1 to 8.0 weight percent of a catalyst, such as aluminum chloride, aluminum bromide, aluminum fluoride, boron trifluoride, or solutions, slurries or complexes thereof. Reaction temperatures for polymerization are from about 0° C. to about 100° C.

The polymerization feed contains about 20 to 60 and preferably 30 to 50 weight percent of a petroleum feed stream, 0 to 20 weight percent chain transfer agent and 40 to 80 weight percent inert solvent, such as toluene. A useful polymerization feed contains between 30 to 50 weight percent and preferably between 35 and 45 weight percent of polymerizable monomers. Polymerizable monomers include, but are not limited to, isobutylene, isoprene, isoamylene (2-methyl-2-butene), trans-piperlene (trans-1,3 pentadiene), cis-piperyene (cis-1,3 pentadiene), cyclopentadiene and dicyclopentadiene. The yield on total feed, excluding solvent, is from about 50 to about 90 weight percent. The yield of resin from the polymerizable monomers is typically, but not limited to, from 70 to 100 weight percent. Near complete or about 100 weight percent conversion of the polymerizable monomers is useful with the present invention.

The petroleum feed streams contain unsaturated hydrocarbons consisting of $C_4$ to $C_{10}$ olefins and/or diolefins boiling in the range from 20 to 200° C., preferably from 30 to 180° C. Such streams are often commercially available from petroleum refining or petrochemical complexes. Such streams may result from the catalytic cracking of crude oil components or the steam cracking of light hydrocarbons. A predominant $C_5$ hydrocarbon stream containing piperylenes is a particularly useful hydrocarbon stream. Distillation is one technique commonly used to concentrate the piperylenes from other hydrocarbons.

Quantities of cyclopentadiene and methylcyclopentadiene may be controlled by heat-soaking the $C_4$ to $C_{10}$ olefinic and diolefinic fraction at temperatures from about 100° C. to about 160° C. During heat soaking the cyclopentadine and methylcyclopentadiene are dimerized to their corresponding dicyclo-dimers. Fractionation of the obtained dimers by distillation removes the dimers from the heat-soaked petroleum feed. It is, however, found that feedstocks containing cycloolefinic and cyclodiolefinic components, like cyclopentadiene and dicyclopentadiene are as functional as feedstocks without these components. Typical compositions of the useful petroleum feed streams prior and post heat-soaking are described below.

| Petroleum Feed, Composition, Wt. % | Prior Heat-soaking | Post Heat-soaking |
| --- | --- | --- |
| Total olefins: | 13 | 11 |
| Total cycloolefins: | 17 | 17 |
| Total diolefins: | 65 | 55 |
| Total cyclodiolefins: | 2 | 15 |

Typical olefins include isobutylene, 1-pentene, 2-methyl-1-pentene and trans and cis 2 pentene.

Typical cycloolefins include cyclopentene and cyclohexene.

Typical diolefins include cis and trans piperylene, 1,4-pentadiene, isoprene, 1,3-hexadiene and 1,4-hexadiene.

Typical cyclodiolefins include cyclopentadiene, dicyclopentadiene, methyl and ethyl substitutes of both components and codimers of the same.

A useful petroleum stream contains at least 70 weight percent of polymerizable monomers with at least 50 weight percent piperylene (pentadienes). Moreover, the stream may contain isoprene, so isoprene rich piperylene streams may also be used. These streams are normally called "crude" $C_5$ streams.

A chain transfer agent generally includes isobutylene, 2-methyl-1-butene, 2-methyl-2-butene or their dimeric oligomers. The chain transfer agents are used to obtain resins with a low and narrow molecular weight distribution. The chain transfer agents may be utilized in a substantially pure form or diluted in an inert solvent, such as toluene or other non-reactive $C_4$ to $C_6$ components. The use of isoamylene (2-methyl-2-butene) as chain transfer agent results in higher softening point at a similar molecular weight as compared to other chain transfer agents. The addition of increased amounts of chain transfer agent typically decreases both the softening point and the molecular weight of the petroleum resin.

The catalyst for the polymerization is used from 0.1 to 8.0 weight percent preferably 0.2 to 3.0 weight percent and more preferably 0.3 to 2.0 weight percent based on the amount of polymerizable monomers in the polymerization feed. Cationic polymerization is useful, but other useful polymerization techniques, such as anionic polymerization, thermal polymerization, coordination polymerization utilizing Ziegler-Natta catalysts, and the like, may also be practiced with the present invention.

Polymerization temperatures are typically from about 0° C. to about 100° C. Desirable polymerization temperatures are from about 40° C. to about 80° C. The polymerization reaction is typically exothermic. To maintain the reaction temperature at a desirable temperature heat is often removed from a reaction vessel through a cooling mechanism, such as heat exchange equipment. Furthermore, the reaction mixture of monomers may be diluted with a solvent, such as toluene or other non-reactive hydrocarbons. Dilution of the reaction mixture with about 40 to 80 weight percent hydrocarbon solvent is useful.

The polymerization can be carried out in a continuous process or in a batch mode. Reaction time for the polymerization is typically from 1.0 to 4.0 hours.

After polymerization the residual catalyst may be removed by, for example, the addition and extraction with water. The obtained polymer-solvent mixtures may be stripped to remove unreacted hydrocarbons, solvents and low molecular weight oligomers.

Resins thus obtained and desirable for use as polymer resin for maleic anhydride grafting made according to this invention have:

a. a mettler drop softening point (MDSP) varying from liquid to 110° C.;

b. a resin viscosity at 25° C. higher than 1,000 mPa.s;

c. an Mn from 400 to 1,200, an Mw from 600 to 3,000 dalton, an Mz from 800 to 6,500 and an Mw/Mn below 3.0; and d. a mixed methylcyclohexane cloud point (MMAP) from about 60° C. to about 100° C.

Unlike low-molecular weight compounds where the molecular weight in a sample is uniform, the polymers of the present invention are polydisperse. The resins are composed of polymer chains of varying length and hence often exhibit a distribution of molecular weights. As such the resins are often characterized by different molecular weight expressions as described below:

Number average molecular weight, $$M_n = \frac{\sum n_i M_i}{\sum n_i},$$

Weight average molecular weight, $$M_w = \frac{\sum w_i M_i}{\sum w_i},$$

and

Z-average molecular weight, $$M_z = \frac{\sum n_i M_i^3}{\sum n_i M_i^2},$$

where $M_i$ is molecular weight, $n_i$ is the number of moles and $w_i$ is the weight of the i component molecules of the polymer. As used herein the term polydispersity and its variants refer to a ration of molecular weights of the resin, i.e., Mw/Mn.

Molecules of greater mass contribute more to the Mz molecular weight than do less massive molecules. The Mn molecular weight is sensitive to the presence of low-molecular weight tails. The Mz gives an indication of a high molecular weight tail in the resin and has a pronounced effect on the compatibility of the resin in an adhesive base polymer. High Mz is generally undesirable. Mw is an indication of the average molecular weight of the resin. Mn provides information on the lower molecular weight portions of the resin. The polydispersity describes the broadness of the molecular weight distribution and is the ratio of Mw/Mn. Mz, Mn, and Mw can be determined by size exclusion chromatography using a refractive index detector.

A hydrocarbon resin having the following properties is also useful.

a. a resin viscosity at 25° C. from about 2,000 to about 6,000 mPa.s;
   b. an Mn from 500 to 600, an Mw from 600 to 900 dalton, an Mz from 800 to 1200 and an Mw/Mn below 1.5; and
   c. a MMAP cloud point between 55° C. and 70° C.

A particular desirable polymer resin for the use as a precursor resin for maleic anhydride grafting has the following typical properties as described below:

| | |
|---|---|
| MDSP Softening point (° C.) | liquid |
| Viscosity at 25° C. (Brookfield) | 5,690 |
| MMAP (° C.) | 61 |
| Color 50% in toluene (Gardner) | 5.7 |
| Mn (Dalton) | 513 |
| Mw (Dalton) | 671 |
| Mz (Dalton) | 930 |

Molecular weight of the resin may be controlled in part by the amount of chain transfer agent. The viscosity may be controlled in part by steam stripping of the resin. The typical polymerization conditions and compositional analysis for the above-mentioned precursor resin are described below.

| | |
|---|---|
| Temperature | 60° C. |
| Catalyst level | 0.4 wt. on total feed |
| Polymerization Feed: | Weight Percent |
| isobutylene * | 12.5 |
| isoamylene * | 2.2 |
| trans-piperylene * | 15.2 |
| cis-piperylene * | 8.8 |
| cyclopetadiene * | 0.8 |
| dicyclopentadiene * | 4.3 |
| cyclopentene | 6.3 |
| toluene | 40.3 |
| cis-2-pentene | 0.6 |
| trans-2-pentene | 0.2 |
| cyclopentane | 1.7 |
| other C5's | 1.7 |
| other C9/C10's | 5.4 |
| total polymerizable material (*) | 43.8 |

Desirably, the amount of chain transfer agent (isobutylene) on total polymerizable material should be around 25%.

The above-described hydrocarbon resins may be used in a post modification reaction using maleic anhydride as a grafting agent. Maleic anhydride grafting may be carried out thermally or catalytically. The hydrocarbon resin and the maleic anhydride are desirably reacted thermally by most likely the ENE reaction. The mixture of maleic anhydride is heated to temperatures between about 180° C. and 260° C., preferably between 200° C. and 240° C. The amount of maleic anhydride can vary between 0.1 and 30 weight percent on total mixture. The reaction is maintained at this temperature until it is substantially completed. Maleic anhydride grafting results in increased softening points. The grafting is substantially completed as the softening point becomes stable in time, generally 2 hours after the reaction temperature has been reached. The reaction product may additionally be steam stripped to remove volatile components and unreacted maleic anhydride.

Resins thus obtained made according to the present invention have:

a. a MSDP softening point varying from 40° C. to 140° C.;
   b. a viscosity at 120° C. (Brookfield) between 1000 to 10,000 mPa.s;
   c. a Mn from 600 to 1,200 dalton, an Mw from 900 to 3,000 dalton, an Mz from 1,200 to 7,000 dalton and an Mw/Mn below 3.0; and
   d. an acid number between 0.1 and 200 mg KOH/g resin.

Desirably, the resins have an acid number from about 30 to about 200 mg KOH/g resin after grafting with maleic anhydride.

A resin grafted with 25 wt. % maleic anhydride is useful as a rosin alternative and has the following properties:

a. a MSDP softening point varying from 75° C. to 95° C.;
   b. a viscosity at 120° C. (Brookfield) between 1500 to 3000 mPa.s;
   c. a Mn from 600 to 800 dalton, an Mw from 900 to 1200 dalton, an Mz from 1000 to 1500 dalton and an Mw/Mn below 2.0; and
   d. an acid number between 140 and 170 mg KOH/g resin.

A particular desirable resin with 25 weight percent maleic anhydride adduction for the use as synthetic rosin alternative has the following typical properties:

| | |
|---|---|
| MDSP Softening point (° C.) | 86.6 |
| Viscosity at 120° C. (Brookfield) | 2,020 |
| MMAP (° C.) | 24 |
| Color 50% in toluene (Gardner) | 15.6 |
| Acid number (mgKOH/g resin) | 157 |
| Mn (Dalton) | 717 |
| Mw (Dalton) | 925 |
| Mz (Dalton) | 1,243 |

This resin was based on 25 weight percent maleic anhydride adduction at 240° C. The product was steam stripped at 240° C. for 10 minutes and the total yield of the adduction reaction was 92 weight percent. The physical properties, such as viscosity at 120°, softening point and acid number, of this resin are very comparable to natural rosin. Solubility in caustic, thermal stability and recovery from a caustic solution were also comparable or even more favorable than natural rosin as is shown in the examples.

The resins of the present invention are desirably prepared by chemically reacting a predominantly $C_5$ hydrocarbon stream containing unsaturated aliphatic monomers with a second hydrocarbon stream having an isoolefin monomer. The unsaturated aliphatic monomers include a combination of piperylene monomers, less than about 15% weight cyclopentadiene and dicyclopentadiene monomers and less than about 3% weight isoprene. The streams are combined to obtain a weight ratio of the isoolefin monomer to the unsaturated aliphatic monomers from about 0.25/1 to about 0.75/1.

The combined streams are polymerized at a temperature from about 25 to about 75° C. to form a polymer resin. The polymer resin is acid modified resin with dicarboxylic acid or anhydride at a weight ratio from about 0.15 to about 0.45 of dicarboxylic acid or anhydride to the unsaturated aliphatic monomers and the isoolefin monomer. The acid-modified C5 resin is recovered after washing it with water. The resin may also be steam stripped to control viscosity.

A useful dicarboxylic acid or anhydride includes maleic anhydride. A useful isoolefin monomer includes isobutylene, isoamylene and combinations thereof.

The process of the present invention further includes a step of providing from about 0.1 to about 8% weight of a Friedel-Crafts catalyst for catatonically polymerizing the hydrocarbon streams. Cationic polymerization is useful, but other useful polymerization techniques, such as anionic polymerization, thermal polymerization, coordination polymerization utilizing Ziegler-Natta catalysts, and the like, may also be practiced with the present invention.

In one aspect of the process of the present invention, the hydrocarbon streams are combined at a weight ratio of the isoolefin monomer to the unsaturated aliphatic monomers from about 0.25/1 to about 0.75/1 to form a hydrocarbon resin. The hydrocarbon resin is acid modified with from about 0.15 to about 0.45 weight ratio of dicarboxylic acid or anhydride to the unsaturated aliphatic and isooelfin monomers. The acid-modified resins thus obtained made according to the present invention have a MSDP softening point varying from 40° C. to 140° C.; a viscosity at 120° C. (Brookfield) between 1000 to 10,000 mPa.s; a Mn from 600 to 1,200 dalton, an Mw from 900 to 3,000 dalton, an Mz from 1,200 to 7,000 dalton and an Mw/Mn below 3.0; and an acid number between 0.1 and 200 mg KOH/g resin. Desirably, the resins have an acid number from about 30 to about 200 mg KOH/g resin after grafting with maleic anhydride.

In another aspect of the process of the present invention, the hydrocarbon streams are combined at a weight ratio of the isoolefin monomer to the unsaturated aliphatic monomers from about 0.35/1 to about 0.50/1 to form a hydrocarbon resin. After grafting the hydrocarbon resin with about 25 weight percent dicarboxylic acid or anhydride, for instance, maleic anhydride, the acid-modified resin of this aspect has an acid number from about 140 to about 170 mg KOH/g, a mettler drop softening point from about 75° C. to about 95° C. and a Brookfield viscosity at 120° C. from about 1,500 to about 3,000 mPa.s. This acid-modified resin may also have an Mn from about 600 to about 800 daltons, an Mw from about 900 to about 1,200 daltons, an Mz from about 1,000 to about 1,500 daltons and a polydispersity from about 1.2 to about 2.0.

The present invention is further described with reference to the following non-limiting examples.

EXAMPLES

Example 1

An acid-modified C5 hydrocarbon resin was prepared from a piperylene stream. Typical component analysis of the piperylene stream is shown in Table 1. Weight parts, as shown in Table 2, of the piperylene stream, isobutylene and toluene were combined into a reactor. The amount of toluene, which is a non-reactive hydrocarbon solvent, was set at about 40 weight percent. The amounts of the piperylene stream, and isobutylene were controlled to a 0.4/1 weight ratio of isobutylene to unsaturated aliphatic monomers. The unsaturated aliphatic monomers included isoprene, cis-piperylene, trans-piperylene, cyclopentadiene and dicyclopentadiene.

The petroleum resin feed was dried over a calcium chloride and added together with the chain transfer again at a speed of 1500 ml/h to a continuous stirred tank reactor of 6 liters. About 0.4 % weight catalyst ($BF_3$ Friedel-Crafts catalyst) was simultaneously added and the mixture was circulated from the bottom of the reactor to the catalyst inlet point. The mixture was continuously removed at a level of 3 liters so the reaction time was about 2 hours. The mixture was deactivated using water and washed in three steps with water before it was stripped under vacuum to remove the solvent and some of the low molecular weight material.

The resin and the maleic anhydride were put in a reactor, consisting of a three necked flask equipped with a stirrer, reflux condenser, heating capabilities, sample points and addition points. The mixture was heated to 220° C. in about 2 hours. The mixture was maintained at this temperature until the softening point was stable in time (about 2 hours). The temperature in the reflux condenser was controlled in such a way that the maleic anhydride remains liquid and does not solidify. Maleic anhydride has a melting point of about 53° C. and boiling point of about 202° C. Steam was applied, as necessary, to the reactor mixture to obtain the desired properties.

The MDSP softening point was determined according to the Hercules US method R 25-3C with the Mettler Toledo FP90 central processor and a FP83HT dropping point cell, using MSDP cups with a hole of 4.5 mm.

The MMAP (Mixed Methylcyclohexane Cloud Point) was determined using a modified ASTM D-611-92 procedure. The Methylcyclohexane is substituted for the heptane used in the standard test procedure. The procedure uses resin/aniline/methylcyclohexane in a ratio 1/2/1 (5 g/10 ml/5 ml), and the cloud point is determined by cooling a heated, clear blend of the three components until a complete turbidity just occurs.

To determine the Gardner color the resin was mixed with reagent grade toluene at room temperature until all the resin was dissolved. The color was determined spectrofotometically using method ASTM D-1544-80 (also ISO 4630) on a LICO 200 photometer available from Nederland B. V., Kesteren, the Netherlands.

The molecular weights Mn, Mw, Mz and the polydispersity (=Mw/Mn) were determined by size exclusion chromatography using a refractive index detector and calibrated against polystyrene standards.

The resin viscosity was determined using a Brookfield viscosity meter at several temperatures according to ASTM D-3236.

The acid number was measured according to the Hercules US R 60-1a test method. About 2 g of resin was dissolved in 100 ml isopropylalcohol/toluene 3:1 mixture and titrated with a 0.25 N methanolic KOH solution. Phenolftaleine was used as indicator.

TABLE 1

Typical Component Analysis of the Piperylene Stream

| Component | Weight Percent |
| --- | --- |
| isobutylene | 0 |
| isopentane | 0 |
| 1-pentene | 0 |
| 2-methyl-1-butene | 0 |

TABLE 1-continued

Typical Component Analysis of the Piperylene Stream

| Component | Weight Percent |
|---|---|
| n-pentane | 0 |
| isoprene | 0.4 |
| trans-2-pentene | 0.2 |
| cis-2-pentene | 0.7 |
| 2-me-2-butene (isoamylene) | 4.8 |
| trans-1,3-pentadiene (trans-piperylene) | 40.1 |
| cyclopentadiene | 3.4 |
| cis-1,3-pentadiene (cis-piperylene) | 22.3 |
| cyclopentene | 16.7 |
| cyclopentane | 2.4 |
| dicyclopentadiene | 8.1 |
| unknowns | 0.8 |
| Total | 100 |

TABLE 2

Inventive Resin Composition No. 1

| | Resin Composition No. 1 |
|---|---|
| Catalyst, Wt. % | 0.4 |
| Piperylene Stream | 47.2 |
| Isobutylene | 12.5 |
| Toluene | 40.3 |
| Total Monomer content | 43.6 |
| Reaction Temperature ° C. | 50 |
| Results: | |
| Mettler Drop Softening Point | Liquid |
| Gardner Color | 5.7 |
| MMAP ° C. | 61 |
| Mn (daltons) | 513 |
| Mw (daltons) | 671 |
| Mz (daltons) | 930 |
| Mw/Mn | 1.3 |

TABLE 3

Acid Modified Inventive Composition No. 1

| | Acid Modified Resin Composition No. 1 |
|---|---|
| Maleic Anhydride (wt. %) | 25.0 |
| Mettler Drop Softening Point (° C.) | 86.6 |
| Acid Number (mg KOH/g) | 157 |
| Gardner Color | 15.6 |
| MMAP ° C. | 24 |
| Brookfield Viscosity @ 120° C. (mPa · s) | 2,020 |
| Mn (daltons) | 717 |
| Mw (daltons) | 925 |
| Mz (daltons) | 1,243 |
| Mw/Mn | 1.3 |

Example 2

A second inventive composition was prepared and analyzed as described in Example 1. The amount of isobutylene was increased to 16.5 percent to lower the softening point. The resin was acid modified at 25 wt. % maleic anhydride. Other details are presented in Tables 4 and 5.

TABLE 4

Inventive Resin Composition No. 2

| | Resin Composition No. 2 |
|---|---|
| Catalyst, Wt. % | 0.4 |
| Piperylene Stream | 42.4 |
| Isobutylene | 16.5 |
| Toluene | 41.1 |
| Total Monomer content | 48.1 |
| Reaction Temperature ° C. | 60 |
| Results: | |
| Mettler Drop Softening Point (° C.) | Liquid |
| Gardner Color | 6.4 |
| MMAP ° C. | 65 |
| Mn DRI (daltons) | 489 |
| Mw DRI (daltons) | 607 |
| Mz DRI (daltons) | 790 |
| Mw/Mn | 1.2 |

TABLE 5

Acid Modified Inventive Composition No. 2

| | Acid Modified Resin Composition No. 2 |
|---|---|
| Maleic Anhydride (wt. %) | 25 |
| Mettler Drop Softening Point (° C.) | 82.7 |
| Acid Number (mg KOH/g) | 134 |
| Gardner Color | 15.6 |
| MMAP ° C. | 25 |
| Brookfield Viscosity @ 120° C. (mPa · s) | 2,090 |
| Mn (daltons) | 709 |
| Mw (daltons) | 942 |
| Mz (daltons) | 1,373 |
| Mw/Mn | 1.3 |

Example 3

The acid modified compositions from Examples 1 and 2 were thermally treated and compared to natural rosin. The inventive compositions had improved thermal stability as compared to natural rosin, as exhibited by lower MDSP's after thermal treatment. Results are shown below in Table 6.

TABLE 6

| | Acid Modified Composition No. 1 | Acid Modified Composition No. 2 | Natural Rosin |
|---|---|---|---|
| Maleic Anhydride (wt. %) | 25.0 | 25.0 | |
| MDSP (° C.) | 83.6 | 82.7 | 80.2 |
| MMAP (° C.) | 24 | 25 | |
| Acid Number | 145 | 134 | 185 |
| Color (G) | 15.6 | 15.6 | 7.6 |
| Viscosity (mPa · s) | | | |
| at 110° C. | 5,000 | 6,500 | 1,500 |
| at 120° C. | 2,020 | 2,090 | 450 |
| at 130° C. | 1,100 | 865 | 210 |
| Stability at 2 hours at 200° C. | | | |
| MDSP (° C.) | 86.6 | 83.8 | 92.1 |
| Viscosity (mPa · s) | | | |
| at 110° C. | 11,100 | 6,530 | 6,450 |
| at 120° C. | 3,530 | 2,120 | 1,675 |
| at 130° C. | 1,415 | 890 | 640 |

TABLE 6-continued

|  | Acid Modified Composition No. 1 | Acid Modified Composition No. 2 | Natural Rosin |
|---|---|---|---|
| Stability at 72 hours at 135° C. | | | |
| MDSP (° C.) | 96.8 | 91.2 | 108.3 |
| Viscosity (mPa · s) | | | |
| at 110° C. | 45,900 | 18,450 | 24,000 |
| at 120° C. | 12,560 | 5,480 | 6,040 |
| at 130° C. | 4,440 | 2,120 | 2,100 |

Example 4

The properties of the inventive acid modified resins and natural rosin were compared after recovery from a caustic solution.

25 g of acid modified resin from Example 2 was dissolved in a 13.6 wt. % NaOH solution at 80° C. Complete dilution took about 15 minutes. The mixture was cooled down to a temperature below 25° C. and a 20 wt. % HCl solution was slowly added while the mixture was stirred. The product precipitated. For rosin the addition of HCl was stopped when the pH of the mixture was between 6 and 6.5. For the inventive composition the addition was stopped at about a pH of 3.5. The mixture was allowed to stand for 24 hours. The precipitated material was filtered under vacuum using a buchner funnel. The solid rosin was dried in an oven between 50 and 600. Properties were determined.

The recovered acid modified resin had comparable properties to similarly recovered natural rosin. Results are shown below in Table 7.

TABLE 7

|  | Acid Modified Composition No. 2 | Natural Rosin |
|---|---|---|
| MDSP (° C.) | 82.7 | 86.5 |
| Acid Number (mg KOH/g) | 142 | 166 |
| Mn (dalton) | 709 | 679 |
| Mw (dalton) | 942 | 718 |
| Mz (dalton) | 1,373 | 768 |
| Initial Results After Recovery | | |
| pH | 3.5 | 6.3 |
| Yield (wt. %) | 92.0 | 96.9 |
| Acid Number (mg KOH/g) | 198 | 108 |
| Mn (dalton) | 751 | 685 |
| Mw (dalton) | 934 | 725 |
| Mz (dalton) | 1,201 | 772 |
| Results After Recovered Resin Heating To 200° C. | | |
| MDSP (° C.) | 114.2 | 114.4 |
| Acid Number (mg KOH/g) | 158 | 112 |
| Mn (dalton) | 751 | 641 |
| Mw (dalton) | 1,001 | 664 |
| Mz (dalton) | 1,464 | 691 |
| Results After Heating Recovered Resin To 300° C. | | |
| MDSP (° C.) | 105.6 | 120.8 |
| Acid Number (mg KOH/g) | 114 | 121 |
| Mn (dalton) | 771 | 671 |
| Mw (dalton) | 1,032 | 705 |
| Mz (dalton) | 1,553 | 749 |

In the foregoing the invention has been described by means of specific embodiments, but it will be understood that various changes and modifications may be performed without deviating from the scope and spirit of the invention.

What is claimed is:

1. An acid-modified hydrocarbon resin suitable as a natural rosin alternative comprising the reaction product of:
   (a) a first predominantly $C_5$ hydrocarbon stream comprising unsaturated aliphatic monomers further comprising a combination of piperylene monomers;
   (b) a second hydrocarbon stream comprising an isoolefin monomer; and
   (c) an acidic stream comprising a dicarboxylic acid or anhydride;
   wherein a weight ratio of said isoolefin monomer to said unsaturated aliphatic monomers is from about 0.25/1 to about 0.75/1 and a weight ratio of said dicarboxylic acid or anhydride to said unsaturated aliphatic monomers and said isoolefin monomer is from about 0.15 to about 0.45 to yield said resin having an acid number from about 30 to about 170 mg KOH/g and a mettler drop softening point from about 40° C. to about 140° C.

2. The resin of claim 1 wherein said resin has an acid number from about 140 to about 170 mg KOH/g of said resin and a mettler drop softening point from about 70 to about 95° C.

3. The resin of claim 1 wherein said resin has an Mn from about 600 to about 1,200 daltons, an Mw from about 900 to about 3,000 daltons, an Mz from about 1,000 to 7,000 daltons and a polydispersity of about 1.0 to about 3.0.

4. The resin of claim 1 wherein said resin has an Mn from about 600 to about 800 daltons, an Mw from about 900 to about 1,200 daltons, an Mz from about 1,000 to about 1,500 daltons and a polydispersity from about 1.2 to 2.0.

5. The resin of claim 1 wherein said resin has a Brookfield viscosity at 120° C. from about 1,000 to about 10,000 mPa.s.

6. The resin of claim 1 wherein said resin has a Brookfield viscosity at 120° C. from about 1,500 to about 3,000 mPa.s.

7. The resin of claim 1 wherein said isoolefin monomer is selected from the group consisting of isobutylene, isoamylene and combinations thereof.

8. The resin of claim 1 wherein the weight ratio of said isoolefin monomer to said unsaturated aliphatic monomers is from about 0.35/1 to about 0.50/1.

9. The resin of claim 1 wherein said dicarboxylic acid or anhydride is maleic anhydride.

10. A process for making an acid-modified polymer resin suitable as a natural rosin alternative and having an acid number from about 30 to about 170 mg KOH/g and a mettler drop softening point from about 40° C. to about 140° C. comprising:
    (a) providing a first predominantly $C_5$ hydrocarbon stream comprising unsaturated aliphatic monomers further comprising a combination of piperylene monomers;
    (b) providing a second hydrocarbon stream comprising an isoolefin monomer;
    (c) combining said streams to obtain a weight ratio of said isoolefin monomer to said unsaturated aliphatic monomers from about 0.25/1 to about 0.75/1;
    (d) polymerizing said combined streams at a temperature from about 25 to about 75° C. to form a copolymer resin;
    (e) acidifying said polymer resin with dicarboxylic acid or anhydride at a weight ratio from about 0.15 to about 0.45 of said dicarboxylic acid or anhydride to said unsaturated aliphatic monomers and said isoolefin monomer; and
    (f) recovering said acid-modified copolymer resin.

11. The process of claim 10 wherein said dicarboxylic acid or anhydride is maleic anhydride.

12. The process of claim 10 wherein said isoolefin monomer is selected from the group consisting of isobutylene, isoamylene and combinations thereof.

13. The process of claim 10 further including the step of providing from about 0.1 to about 8% weight of a Friedel-Crafts catalyst for catatonically polymerizing said streams.

14. The process of claim 1 wherein said combining of said streams is at a weight ratio of said isoolefin monomer to said unsaturated aliphatic monomers from about 0.35/1 to about 0.50/1 and further wherein said acid-modified polymer has an acid number from about 140 to about 170 mg KOH/g and a mettler drop softening point from about 75° C. to about 95° C.

15. The process of claim 14 wherein said acid-modified polymer has a Brookfield viscosity at 120° C. from about 1,500 to about 3,000 mPa.s.

16. The process of claim 14 wherein said acid-modified polymer has an Mn from about 600 to about 800 daltons, an Mw from about 900 to about 1,200 daltons, an Mz from about 1,000 to about 1,500 daltons and a polydispersity from about 1.2 to about 2.0.

17. An acid-modified hydrocarbon resin suitable as a natural rosin alternative made by the process of claim 10.

* * * * *